United States Patent

Ubert et al.

[11] Patent Number: 5,868,064
[45] Date of Patent: Feb. 9, 1999

[54] BASKET FOR A HOT AIR OVEN FOR THE PREPARATION OF FOODSTUFFS

[75] Inventors: Harald Ubert, Raesfeld; Helmut Heller, Rhede, both of Germany

[73] Assignee: Ubert Gastrotechnik G.m.b.H., Raesfeld, Germany

[21] Appl. No.: 776,399

[22] PCT Filed: Dec. 8, 1995

[86] PCT No.: PCT/EP95/04845

§ 371 Date: Jan. 21, 1997

§ 102(e) Date: Jan. 21, 1997

[87] PCT Pub. No.: WO96/36264

PCT Pub. Date: Mar. 21, 1996

[30] Foreign Application Priority Data

May 19, 1995 [DE] Germany ............... 195 18 181.6

[51] Int. Cl.⁶ ............... A47J 37/04; A47J 43/18; F24C 7/00; F24C 15/16
[52] U.S. Cl. ............... 99/427; 99/330; 99/357; 99/443 R; 99/450; 99/476; 126/21 A; 219/400
[58] Field of Search ............... 99/323.5, 325–333, 99/337, 330, 338, 427, 348, 357, 352–355, 467, 468, 476, 483, 426, 484, 443 C, 486, 443 R, 447–450; 366/69, 96–98, 144–147, 314, 601; 426/501, 232, 512, 520, 523; 219/492, 389, 400; 34/186, 225; 126/21 A

[56] References Cited

U.S. PATENT DOCUMENTS

| 4,155,294 | 5/1979 | Langhammer et al. ............ 99/51 |
| 4,829,158 | 5/1989 | Burnham ............ 219/400 |
| 5,134,927 | 8/1992 | McCarthy et al. ............ 99/427 |
| 5,193,444 | 3/1993 | Bar-Sheshet ............ 99/427 |
| 5,445,073 | 8/1995 | Gilwood ............ 99/427 |
| 5,579,681 | 12/1996 | Ubert et al. ............ 99/427 |

FOREIGN PATENT DOCUMENTS

| 2 452 906 | 10/1980 | France . |
| 26 57 744 | 6/1978 | Germany . |
| 93-018 349 | 9/1993 | WIPO . |

*Primary Examiner*—Timothy F. Simone
*Attorney, Agent, or Firm*—Milton Oliver; Ware, Fressola, Van Der Sluys & Adolphson

[57] ABSTRACT

A hot air oven for food preparation, with a housing, with a cooking chamber that is defined by side walls as well as a bottom wall and a covering wall, with a blower for generating a hot air current in the cooking chamber, with a basket for the food, which basket can be inserted into the cooking chamber, wherein the basket can be rotated around a rotational axis and in operation, is penetrated by the hot air current, and is particularly easy to clean because, at least in sections along its circumference, the basket has a wall that is made of sheet metal and is provided with openings in its wall.

7 Claims, 2 Drawing Sheets

BASKET FOR A HOT AIR OVEN FOR THE PREPARATION OF FOODSTUFFS

FIELD OF THE INVENTION

The present invention relates to a hot air oven for the preparation of foods.

BACKGROUND

Hot air ovens of this kind are known, for example, from U.S. Pat. 4,155,294. Hot air ovens are being used in increasing quantities for the preparation of deep-frozen foods, e.g. french fries, because the usual preparation in a deep fryer is meeting with increasing disapproval due to the high fat content of the prepared food. In contrast, preparation in a current of hot air is advantageous, insofar as the fat content of the finished food is concerned, but it also produces a resulting improvement in flavor.

In the known hot air ovens, a basket for containing the food is inserted into the cooking chamber, which basket is made of a stainless steel wire mesh welded into a frame made of angled sections so that a block-shaped basket is produced, which has a square cross section in the direction of the rotational axis and is open on one end. This basket can be removed from the hot air oven for filling, can then be loaded via its open end with the food to be prepared, and reinserted into the oven, wherein a covering sieve closes the open upper end of the basket so that the food cannot fall out when the basket is rotated around its rotational axis. These wire baskets have serious disadvantages. The cleaning of this kind of basket is very difficult since food residues and other encrustations can adhere between the wires of the wire mesh that rest against each other at a crossing point, and can only be removed from there with difficulty. Furthermore, impurities adhere chiefly in the corners of the block-shaped basket because the wire mesh is welded into the angled sections there, resulting in a device that is very difficult to clean. This problem leads to the fact that the cleaning of the basket, which is required from a hygienic standpoint, is neglected.

A further problem in hot air ovens is the preparation time. In particular in snack bars, a particularly rapid food preparation is sought. For this, it is required that the hot air in the inner chamber of the hot air oven can flow favorably through the basket in order to effectively cook and roast the food. The through flow occurs approximately in the radial direction of the basket, so that the open cross section of the wire sieve or wire grating used should be noted. Since the flow does not always occur perpendicular to the wire grating, but also at times at a certain angle due to the rotation of the basket, the free cross section should also be considered at this angle of 45° for example. In the course of this, it is determined that the free cross-section of a wire sieve drops relatively quickly when there is a deviation from the perpendicular

SUMMARY OF THE INVENTION

It is therefore an object of the invention to produce a hot air oven for food preparation, in which the basket is better for cleaning and the through flow of the basket is possible in a more effective manner.

Because the basket has a wall made of sheet metal and provided with openings, at least in sections along its circumference, a smooth-faced inner surface is produced which can be easily wiped clean. Furthermore, because a wall made of sheet metal is very thin anyhow in comparison to the thickness of two superposed wire layers in the crossing region of the wires of a wire mesh, the flow of the openings provided in the sheet metal is much better than in the known hot air ovens, even at the angles that occur in operation.

In particular, it is advantageous if the openings are elongated in shape, where the elongated openings are preferably aligned in the circumference direction, because then, even at flow angles that diverge sharply from the perpendicular, there is still a favorable open sieve face (in the projection). The circulation of the food on the inside of the basket that rotates in operation, is advantageously influenced if in a cross section perpendicular to the rotational axis, the basket has an essentially square shape with flattened corner regions. In sections, the flattened or also rounded corner regions should not be penetrated by openings so that a guide channel for the basket can be disposed here, which guides the basket when it is pulled axially out of the oven housing.

It is particularly easy to produce the basket if the wall along the circumference is made of a one-piece sheet metal part and the openings to be let into the wall are punched out from the side which will later be the inside of the basket.

In actual practice, it is advantageous if the basket is provided with a coating on its inside, which prevents sticking and is therefore easy to clean. A coating of this kind can contain PTFE, for example. In this case, preferable coating processes are those in which the coating adheres particularly well to the base material of the basket.

BRIEF FIGURE DESCRIPTION

A preferred exemplary embodiment of the basket according to the invention is represented below in FIG. 1, showing the basket, and FIG. 2, showing a schematic cross-section of the basket in the oven.

DETAILED DESCRIPTION

Figure 1:
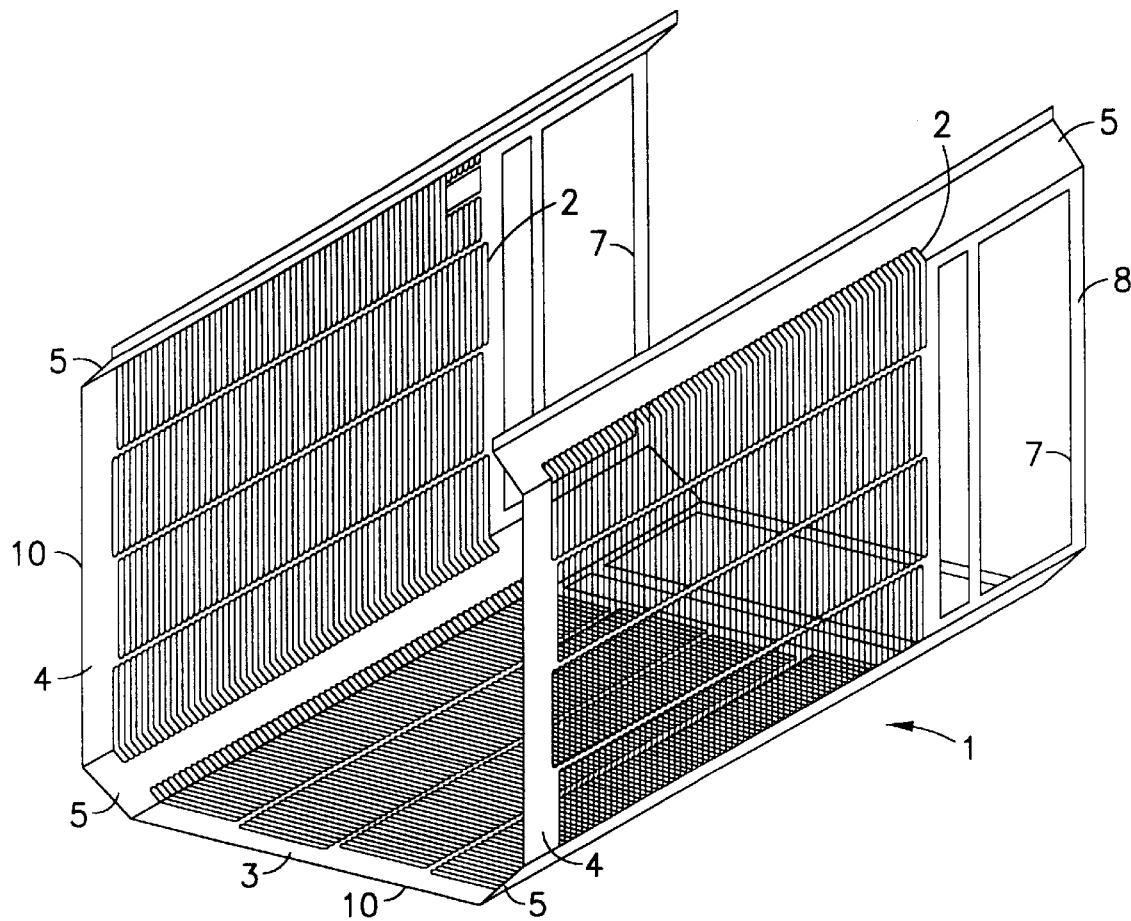

FIG. 1 shows a sheet metal jacket 1, which is made of a sheet that is initially smooth. The jacket has a large number of elongated openings 2, which have straight long sides, are rounded on their narrow ends, and as a whole, have a large proportion of length to width. Thus openings are produced that are approximately 4 mm wide and 50 mm long and are aligned with their long sides in the circumference direction of the basket. The component, which for the time being is flat after the punching, is respectively bent by 45° in the lateral direction of the openings in such a way that a box-shaped basket jacket is produced, which has an essentially square inner cross section and a length which clearly exceeds the cross section of the basket. The jacket constitutes a bottom wall 3 and two parallel side walls 4 that adjoin the bottom wall 3. The walls 3 and 4 are respectively disposed perpendicular to each other, and the transition region between the walls 3 and 4 produces a guide face 5 that is disposed at an angle of 135° to both walls. With this geometry, it is possible, in order to produce the wall 1, to bend the sheet by only 45° at the edges, which simplifies production, allows the inside of the basket to not become too angular, since that would interfere with cleaning, and furthermore, on the one hand, the circulation of the food during operation is expedited, and on the other hand, the food is not damaged.

The guide faces 5 have a region, which is kept free of openings and extends parallel to what will later be the rotational axis of the basket, in which region the guide for the basket can engage. For filling and emptying, the basket is pulled out and slid back into the hot air oven in a known manner so that these guides that are parallel to the axis must support the basket when it is moving.

In the rear region of the wall in each side wall 4 and in the bottom wall 3 of the basket, rectangular openings 7 are provided that cover approximately ⅓ the depth of the wall 1 in the direction parallel to the axis of the basket, while they leave virtually the entire region free at the level between the guide faces 5, Only a frame-like intermediary piece 8 is left on the rear end of the walls 3 and 4.

For the final completion of the basket, an end face closure, which is not shown in detail, is affixed to the walls 3 and 4. For this purposes the walls 3 and 4 are welded to a closure plate in the region of their end faces 10 so that the basket is closed in this direction. Opposite the end face edges 10, a corresponding closure plate is inserted between the walls 3 and 4 in such a way that the region of the walls that is provided with elongated holes is disposed between the two closure plates. For the region provided with elongated holes, the closure plate on the back side forms a back wall disposed parallel to the front side, which separates the region penetrated by elongated holes from the region penetrated by the large, rectangular cutouts.

In the later use of the basket, the food is placed in the region that is provided with the elongated holes, the basket is slid into a basket holder provided in the hot air oven, and is covered on its upper end by a covering wall that is formed corresponding to the walls 3 and 4 respectively. Then, hot air flows through the basket, through its walls 3 and 4, as well as through the cover of the basket holder. The hot air blower is disposed in the vicinity of the basket, in the axial direction behind the rear closure plate so that the inlet air and the outgoing air of the hot air blower can flow through the large, rectangular openings in the rear region of the wall. The wall, though, should be pulled back into the region of the blower, even if no food is being cooked here, because this region assumes an important support function for supporting the basket when it is pulled out for filling and emptying.

The thus-described basket for a hot air oven is very smooth-faced on the inside, can be cleaned by simple wiping, and offers a large, free cross section for hot air passing through, even at angles that no longer permitted through flow in conventional wire baskets.

The geometry of the elongated holes should be selected so that the food to be inserted, for example french fries of varying cross section, cannot come out through the holes. A dimension of approximately 3 mm by 40 mm to 5 mm by 60 mm is currently preferable. Particularly good results can be achieved with openings of 3.5 mm by 42 mm.

Experience has shown that in a basket produced in this way, a particularly low abrasion is exerted on the food to be prepared. Correspondingly few small particles get into the hot air stream and can burn there, which up to now has led to undesirable degradation of the flavor.

Figure 2:
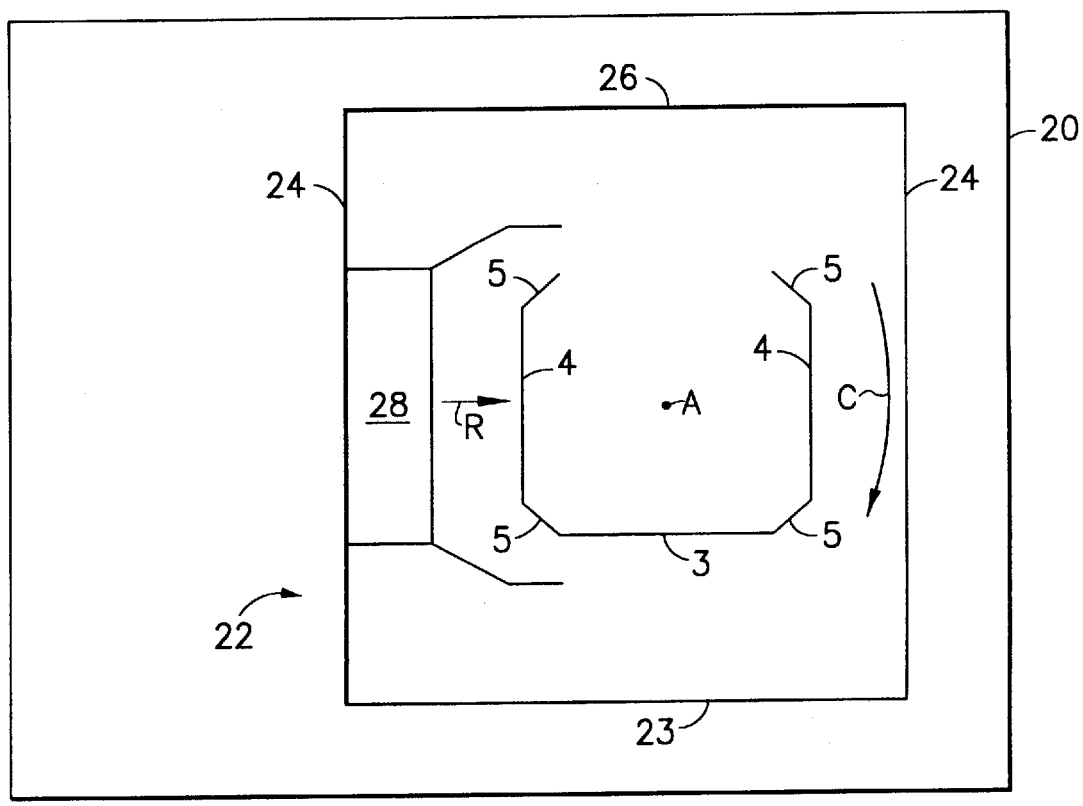

FIG. 2 illustrates schematically an oven 20 having a cooking chamber 22 defined by a bottom wall 23, side walls 24, and a covering wall 26. It includes a blower 28 which directs air in a radial direction R through the basket as the basket is rotated in circumferential direction C about a rotational axis A.

What is claimed is:

1. A hot air oven for food preparation, having a housing (20), a cooking chamber (22) defined by side walls (24) as well as a bottom wall (23) and a covering wall (26), a blower (28) for producing a hot air current in the cooking chamber, a rotatable basket (3, 4, 5) for the food, which basket can be inserted into the cooking chamber (22), wherein the basket is rotatable about a rotational axis (A) in a circumferential direction (C) and, in operation, is penetrated by the hot air current, wherein the basket, at least in sections along its circumference, has a wall that is made of sheet metal and provided with a plurality of elongated openings which are essentially aligned in the circumference direction of the basket.

2. The hot air oven according to claim 1, characterized in that in a cross-section perpendicular to the rotational axis, the basket is essentially square in shape.

3. The hot air oven according to claim 1, characterized in that the corner regions of the wall are flattened or rounded.

4. The hot air oven according to claim 3, characterized in that the flattened or rounded corner regions have guide regions for a basket guide, which are not penetrated by openings.

5. The hot air oven according to claim 1, characterized in that the basket is open on one end.

6. The hot air oven according to claim 1, characterized in that the wall of the basket along its circumference is integrally formed.

7. The hot air oven according to claim 1, characterized in that the wall of the basket, at least on the inside of the basket, is provided with a coating that reduces sticking.

* * * * *

UNITED STATES PATENT AND TRADEMARK OFFICE
CERTIFICATE OF CORRECTION

PATENT NO : 5,868,064
DATED : Feb. 9, 1999
INVENTOR(S): Ubert et al.

It is certified that error appears in the above-identified patent and that said Letters Patent is hereby corrected as shown below:

At column 1, line 55, after "perpendicular" --.-- should be inserted.

At column 3, line 12 "purposes" should read --purpose,--.

Signed and Sealed this

Tenth Day of August, 1999

Attest:

Q. TODD DICKINSON